United States Patent Office 3,389,319
Patented June 18, 1968

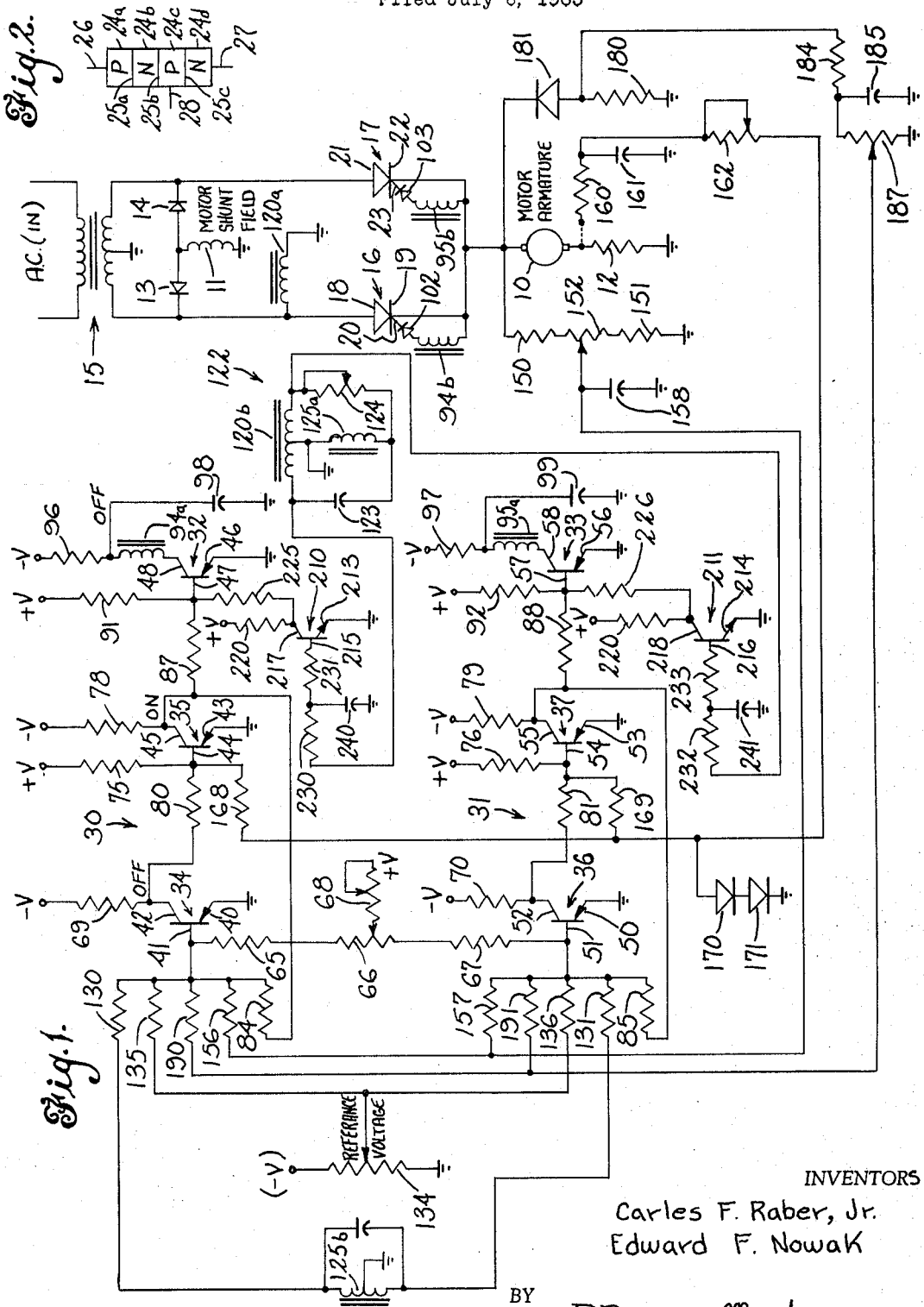

3,389,319
MOTOR SPEED CONTROL SYSTEM
Carles F. Raber, Jr., Simsbury, and Edward F. Nowak, Farmington, Conn., assignors to Pratt & Whitney Inc., West Hartford, Conn., a corporation of Delaware
Filed July 8, 1965, Ser. No. 470,545
11 Claims. (Cl. 318—345)

ABSTRACT OF THE DISCLOSURE

A motor control system for a direct current motor. In particular, this invention is directed to a control system for controlling silicon controlled rectifiers or the like in order to energize DC motors. The control system of this invention includes feedback circuitry to compensate for the IR drop in the motor armature, low speed boost which takes advantage of an armature voltage reversal which occurs at low speeds due to the armature inductance, and means for limiting the maximum possible conduction time of the controlled rectifiers to eliminate an unstable condition which would occur when full reference voltage is applied with the armature motor at a standstill. In particular, the motor speed control system comprises a load to be controlled, including a motor having an armature, a source of AC supply voltage, at least one semiconductor device having an odd number of PN junctions and input, output and control electrodes, the input and output electrodes of said device being connected in series with said source and said load, the maximum value of the signal from said source being such that at least one of said junctions in said device is normally reverse-biased whereby said device is in a non-conducting state, means for providing an adjustable characteristic reference signal, a phase shift circuit, means for coupling said phase shift circuit to said source to derive a phase-shifted signal, means for summing said phase-shifted signal with said reference signal to derive a control signal to forward bias at least one of said junctions, means coupling said control signal to said control electrode, and means responsive to the source of AC supply voltage for limiting the maximum conduction time of said semiconductor device to eliminate an unstable condition which would occur when full reference voltage is applied with the motor armature at a standstill.

---

This invention relates to a motor control system and more particularly to a direct current motor speed control system providing a wide range of regulated adjustable speed drives.

Direct current motors are widely utilized in machine tool applications or in many other applications which require a motor which is capable of having its operating speed varied over a wide range. For many years DC variable-speed motors have been energized from AC lines by using thyratrons or ignition tubes which are arranged so as to change the alternating voltage into a direct voltage suitable for the DC motor. Further modifications have included the use of the combination of phase-shifting network and reference DC voltage to provide a signal to the grids of the thyratrons so as to vary the amount of voltage applied to the motor armature and thereby change its speed of operation. As the prior art control systems evolved, various compensation techniques developed to control and regulate the speed of motors with changing loads. For example: a velocity feedback signal indicative of the DC armature voltage was utilized to hold constant the voltage across the armature and thereby prevent a change of motor speed. Additionally, IR compensation was included in many of the prior art motor control systems in order to compensate for the voltage drop caused by current flowing through the internal resistance of the armature.

As the electronics industry grew, new solid state components, such as the controllable rectifier, i.e. SCR's, were developed. The characteristics of the controllable rectifiers made them particularly suitable as a replacement for the thyratrons in motor speed control systems. The controlled rectifier is a solid state device much like the transistor in that it has an anode, a cathode and a control element called a gate. The controlled rectifier conducts when the anode is sufficiently positive with respect to the cathode. Under normal operating conditions, the anode voltage is not set high enough to start conduction, but it is set sufficiently high to maintain current flow once it starts. The gate of the rectifier performs much the same function as the grid of a thyratron. When a small voltage is applied to the gate, the rectifier fires (turns on) provided that the correct anode to cathode voltage is also present.

Thereafter, the gate has no control and cannot stop current flow. The only way to extinguish the rectifier is to remove or reduce the anode to cathode voltage below the holding point. When the current flow is stopped and anode voltage is restored, the gate once again is in a position to exercise control. In replacing the thyratrons with solid state controllable rectifiers, various new and faster phase-shifting and compensating circuitry to control the rectifier was required. Additionally, with the more stringent motor speed regulation demands made by industry, new and improved techniques were required. Accordingly, applicants have developed a new and improved solid state motor speed control system which provides an adjustable speed drive having wide range speed regulation to meet the requirements of industry. Further, applicants have developed high speed trigger circuitry to selectively control the speed of a motor with changing load.

In view of the foregoing, it is an object of this invention to provide a new and improved motor speed control system.

Another object of this invention is to provide new and improved circuitry for generating signals for initiating conduction of controlled rectifiers.

Another object of this invention is to provide new and improved circuitry which provides for isolation between control and power circuits while maintaining a fast response to control signals.

A further object of this invention is to provide new and improved circuitry which includes means for providing a boost in low speed compensation while not affecting the upper end of the motor speed range.

Still other objects and advantages of the invention will in part be obvious and will in part be apparent from the specification.

The invention accordingly comprises the features of construction, combination of elements and arrangements of parts which will be exemplified in the construction hereinafter set forth and the scope of the invention will be indicated in the claims.

For a fuller understanding of the nature and objects of the invention, reference should be had to the following detailed description taken in connection with the accompanying drawing, in which:

FIG. 1 is a schematic diagram of the circuitry of the present invention; and

FIG. 2 is a diagrammatic illustration of a semi-conductor device usable in the invention.

Referring now to FIG. 1, it may be seen that a load is supplied from an alternating current source. In this instance, the load to be supplied is a direct current motor having an armature 10 and a shunt field winding 11.

The armature 10 is shown connected through a series resistor 12 to ground. The shunt field winding 11 is coupled to ground at one end and is coupled at its other end to two back-to-back diodes 13 and 14 which are in turn coupled to an alternating current transformer 15. The diodes 13 and 14 act to full-wave rectify the AC input signal, thus providing means for supplying direct current to the field winding 11. Coupled between the transformer 15 and the armature 10 are two controllable rectifiers 16 and 17. These devices selectively provide direct current to the motor armature in accordance with predetermined signals which are utilized to control the speed of the motor. The rectifiers 16 and 17 comprise anodes 18 and 21, cathodes 19 and 22, and gates 20 and 23, respectively. The anodes 18 and 21 are coupled to the transformer 15 and the cathodes 19 and 22 are coupled to the armature 10. The controlled rectifiers 16 and 17 are of the type illustrated in FIG. 2 of the drawing.

As may be seen in FIG. 2, the controllable semi-conductor rectifiers 16 and 17 may be formed out of contacting zones or regions of four alternating positive and negative types of semi-conducting material, 24a–24d. Between the regions fo material there is formed an odd number of rectifying junctions 25a–25c. An anode input electrode 26 is ohmically coupled to P-type region 24a, a cathode output electrode 27 is ohmically coupled to N-type region 24d, and a control or gate electrode 28 is ohmically coupled to P-type region 24c. The characteristics of this device are such that when a positive voltage is applied to the input electrode 26 and a negative voltage is applied to the output electrode 27, the two outside junctions 25a and 25C are biased in a forward direction. However, the intermediate or center junction 25b is biased in a reverse direction and therefore the current flow through the device is essentially zero. This condition will subsist until a signal is applied to the control electrode or gate 28 which is of such a magnitude as to reverse the bias on the intermediate junction 25b. At this point, current will flow through the device and will be essentially limited only by the applied voltage and the impedance of the load supplied. The device will continue to conduct under these circumstances after the positive voltage has been removed from the gate electrode 28 as long as the input or anode electrode 26 is positive with respect to the output or cathode electrode 27.

Referring again to FIG. 1, it may be seen that when the devices 16 and 17 are permitted to conduct, direct current will flow in the motor armature 10. In order to control the speed of the direct current motor by controlling the amount of direct voltage across the armature 10, this invention provides new and improved circuitry for supplying a variable voltage to the gate or control electrodes 20 and 23 of devices 16 and 17, respectively. The circuitry includes substantially identical push-pull-operated trigger circuits 30 and 31 which are in turn coupled to amplifying transistors 32 and 33, respectively, to control the firing of controllable rectifiers 19 and 22, respectively. The trigger circuit 30 includes a first transistor 34 having an emitter electrode 40, a base electrode 41 and a collector electrode 42, and a second transistor 35 having an emitter electrode 43, a base electrode 44 and a collector electrode 45. The amplifier transistor 32 coupled to trigger circuit 30 has an emitter electrode 46, a base electrode 47 and a collector electrode 48. The trigger circuit 31 includes a first transistor 36 having an emitter electrode 50, a base electrode 51 and a collector electrode 52, and a second transistor 37 having an emitter electrode 53, a base electrode 54 and a collector electrode 55. The amplifier transistor coupled to trigger circuit 31 has an emitter electrode 56, a base electrode 57 and a collector electrode 58.

The transistors 34 and 36 have their emitters 40 and 50 coupled to ground, their bases 41 and 51 coupled to +V through resistors 65–68, and their collectors 42 and 52 coupled through load resistors 69 and 70, respectively, to a supply voltage −V. The transistors 35 and 37 of trigger circuits 30 and 31, respectively, are connected such that their emitters 43 and 53, respectively are coupled to ground, their bases 44 and 54 are reverse biased through resistors 75 and 76 by a biasing voltage +V and their collectors 45 and 55, respectively, are coupled through load resistors 78 and 79 to the supply voltage −V. Additionally, the base 44 of transistor 35 is connected through an input resistor 80 to the collector 42 of transistor 34 and the base 54 of transistor 37 is coupled through an input resistor 81 to the collector 52 of transistor 36. Further, the base 41 of transistor 34 is coupled through a feedback resistor 84 to the collector 45 of transistor 35 and the base 51 of transistor 36 is coupled through a feedback resistor 85 to the collector 55 of transistor 37.

The trigger circuits 30 and 31 are constructed such that transistors 34 and 36 are normally non-conducting and transistors 35 and 37 are normally conducting. Upon the application of a signal of the proper polarity to the bases of transistors 34 and 36, these transistors will conduct and cause transistors 35 and 37 to cease conducting. Due to the presence of the feedback resistors 84 and 85, as transistors 35 and 37 turn off, transistors 35 and 37 will be driven on at a more rapid rate, thus decreasing the response time of the trigger circuits.

The trigger circuits 30 and 31 as previously noted are connected to the amplifying transistors 32 and 33, respectively. More particularly, the base 47 of transistor 32 is coupled through an input resistor 87 to the collector 45 of the transistor 35 and the base 57 of the transistor 33 is coupled through an input resistor 88 to the collector 55 of transistor 37. Additionally, the transistors 32 and 33 are maintained normally nonconducting by the coupling of the bases 47 and 57 through resistors 91 and 92 to a bias voltage +V. The transistors 32 and 33 also have their emitters 46 and 56, respectively, connected to ground and their collectors 48 and 58 coupled to pulse transformer primarys 94a and 95a and resistors 96 and 97, respectively.

Further, coupled at the intersection of transformer primary 94a and resistor 96 is a capacitor 98 and coupled at the intersection of transformer primary 95a and resistor 97 is a capacitor 99. Additionally, there are provided secondaries 94b and 95b coupled to the transformer primaries 94a and 95a, respectively, which are in turn coupled in series with protective diodes 102 and 103, respectively. This series connection of the transformer secondaries 94b and 95b and diodes 102 and 103, respectively, is connected in the gate cathode circuit of the controllable rectifiers 16 and 17, respectively.

In operation, the amplifying transistors 32 and 33 are normally maintained non-conducting until transistors 35 and 37 are caused to cease conducting. During the time that the transistors 35 and 37 are maintained conducting, capacitors 98 and 99 charge up to the source voltage −V. When transistor 35 or 37 is caused to cease conducting, transistor 32 or 33 will turn on, thereby discharging capacitor 98 or 99. The discharging of the capacitor 98 or 99 generates a firing pulse in the transformer secondaries 94b and 95b, respectively, thus selectively firing controllable rectifiers 16 and 17.

To provide signals to sequentially control the firing time of the controllable rectifiers 16 and 17, a transformer primary 120a is connected across the AC transformer 15. A secondary 120b of the same transformer forms a portion of a phase-shift network, generally shown at 122. The remainder of the phase-shaft network 122 includes a capacitor 123, a variable resistor 124 and a transformer primary 125a. The network 122 phase-shifts the impressed AC voltage so that the voltage across a secondary 125b of transformer primary 125a, which is coupled in the input portion of the trigger circuits 30 and 31, leads the anode voltage across the controllable rectifiers by 90 electrical degrees. This voltage is then applied to bases 41 and 51 of transistors 34 and 36, respectively, through input resistors 130 and 131. At the same time, a negative reference voltage provided from a potentiometer 134 is applied to the bases 41 and 51 through biasing resistors 135 and 136, respectively. The combination of the two last-mentioned voltages is utilized to selectively trigger the trigger circuits 30 and 31, thereby causing transistor 32 or 33 to conduct, thus causing a firing signal to appear at the gates of the controllable rectifier 16 or 17. By making the reference voltage more negative the voltage at the bases of transistors 34 and 36, which is instantaneously equal to the algebraic sum of the phase-shifted voltage from transformer secondary 125b and the reference voltage, will cause transistors 34 and 36 to conduct earlier, thus sequentially firing the controllable rectifiers 16 and 17 earlier in the positive half cycle of the AC voltage impressed at the anodes of the rectifiers 16 and 17.

In this manner, adjustment of the reference voltage provides a means for controlling the amount of average full wave rectifier DC voltage applied to the motor armature to thus control the speed of the motor.

In order to maintain the speed of the motor substantially constant with varying loads, the circuit herein includes means for sensing the voltage across the armature 10 (velocity feed-back signal) and means for comparing this voltage with the reference voltage to sequentially control the firing of the rectifiers 16 and 17. The means for sensing the armature voltage includes a series connection of two resistors 150 and 151 coupled to a potentiometer 152. The wiper arm of the potentiometer 152 is coupled to the bases 41 and 51 of transistors 34 and 36, respectively, by input resistors 156 and 157. Since the armature voltage feedback to the transsitors 34 and 36 is of an opposite polarity from the reference voltage obtained from potentiometer 134, any fall-off of the armature voltage results in an advancement of the rectifiers 16 and 17 firing angle and, conversely, any increase in armature voltage results in a retardation of the firing angle of rectifiers 16 and 17. Thus, by the use of this feedback voltage, a preset armature voltage is obtained. The armature voltage feedback circuit also includes the provision of a capacitor 158 to prevent the possibility of firing a controllable rectifier early in the cycle as a result of the reversal of the armature voltage at the end of a conduction period.

A further feature of the invention described herein is the inclusion of feedback circuitry to compensate for the IR drop in the motor armature. The IR compensation circuitry includes a resistor 160, a filtering capacitor 161 and a variable resistor 162 connected across the resistor 12. The resistor 162 is connected to the bases 44 and 54 of transistors 35 and 37, respectively, through input resistors 168 and 169, respectively. The positive voltage obtained across resistor 12 causes the transistors 35 and 37 to cut off earlier in the cycle for a given DC level applied from potentiometer 134 to control transistors 34 and 36. Thus, by the proper adjustment of resistor 162, the firing angle of controllable rectifiers 16 and 17 is advanced to maintain constant motor speed at full motor load.

Also included as part of the IR compensation circuit are voltage clamping diodes 170 and 171 connected between bases 44 and 54 and ground, which limit the IR compensation signal to prevent unstable conditions during periods of high armature inrush currents.

As an additional improvement, this invention includes low speed boost means which takes advantage of an armature voltage reverasl which occurs at low speeds due to the armature inductance, causing the armature voltage to reverse when conduction through a controlled rectifier ceases. The magnitude of this reverse voltage is limited by the resistor 12 and a series connection of a resistor 180 and a diode 181. A negative voltage with respect to ground is developed across resistor 180. This negative voltage is then filtered by a resistor 184 and a capacitor 185 and a portion of this voltage is fed back to base 41 of transistor 34 through resistor 190 and to the base 51 of transistor 36 through resistor 191. This negative voltage advances the firing angle of the signals applied to the controllable rectifiers 16 and 17, thus providing IR boost at low speeds.

At higher motor speeds, the higher back EMF of the armature prevents an actual reversal of armature voltage. Due to the diode 181, no voltage is therefore developed across resistor 180 and, therefore, no IR boost compensation signal is available from this portion of the circuit at the higher motor speeds. This is a highly desirable feature inasmuch as the IR boost circuit which is only required at low speeds does not affect the remainder of the circuit at higher speeds. Additionally, by clamping the reverse armature voltage to a limited low level, this circuit also reduces the peak inverse breakdown voltage to which the controllable rectifiers 16 and 17 are subjected, thereby reducing the possibility of circuit failure.

Another important feature of this invention is the inclusion of means for limiting the maximum possible conduction time of the controllable rectifiers to eliminate an unstable condiiton which would occur when full reference voltage is applied with the armature at a standstill. In this event, the reference voltage provided from the potentiometer 134 would be much greater than the feedback voltage from potentiometer 152, therefore maintaining transistors 35 and 37 continuously conducting and thus preventing firing pulses from being produced by transistors 35 and 37. To prevent this from occurring, transistors 210 and 211 are provided in order to cut off transistors 32 and 33 during the time when the voltage applied to the anode of the controllable recitifier, to which each of these transistors is coupled, is such that the respective controllable rectifiers are inactive. The transistors 210 and 211 have emitters 213 and 214, bases 215 and 216, and collectors 217 and 218, respectively. The emitters 213 and 214 are coupled to ground and the collectors 217 and 218 are coupled through load resistors 220 and 221, respectively, to the voltage source +V. Additionally, the collector 217 is coupled to the base 47 of transistors 32 through a signal-coupling resistor 225, and the collector 218 is coupled to base 57 of transistor 33 through a signal-coupling resistor 226. In order to control transistors 210 and 211, an AC signal essentially in phase with the anode voltage across rectifiers 16 and 17, is derived across the transformer secondary 120b and is applied to base 215 through input resistors 230 and 231 and is applied to base 216 through input resistors 232 and 233. The AC signal applied to transistor 210 cuts off transistors 210 and 32 and charges the capacitor 98 during the negative half cycle of anode voltage for controllable rectifier 16. Similarly, the AC signal applied to transistor 211 cuts off transistors 211 and 33 and charges capacitor 99. In order to limit the maximum possible conduction time of controllable rectifiers 16 and 17, the voltage applied to the bases of transistors 210 and 211 is delayed prior to its being applied to transistors 210 and 211. This is accomplished by the provision of capacitors 240 and 241, respectively, in the input circuits of transistors 210 and 211, respectively.

By delaying the signal applied to the bases 217 and 218, respectively, transistors 210 and 211 and 32 and 33, respectively, are maintained non-conducting during a predetermined early portion of the positive half cycle of the anode voltage of controllable rectifiers 16 and 17, even if transistor 35 or 37 is already non-conducting, thereby preventing a firing pulse from being supplied to rectifiers 16 and 17. Preferably, the amount of delay provided is such that the maximum conduction time of controllable rectifiers 16 and 17 is limited to 150 electrical degrees. Thus, an unstbale condition is eliminated that would occur when full reference voltage is applied with the armature at a standstill.

This completes an explanation of the preferred embodiment of this invention. It will thus be seen that the objects set forth above, among those made apparent from the preceding description, are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A control system comprising means for deriving a first signal voltage indicating a polarity reversal in voltage in a load to be controlled, a source of AC supply voltage, at least one semiconductor device having an odd number of PN junctions and input, output and control electrodes, the input and output electrodes of said device being connected in series with said source and said load, the maximum value of the signal from said source being such that at least one of said junctions in said device is normally reverse-biased whereby said device is in a non-conducting state, means for providing an adjustable characteristic reference voltage, a phase shift circuit, means for coupling said phase shift circuit to said source to derive a phase-shifted signal, means for comparing said reference voltage, said first signal voltage and said phase-shifted voltage to provide a control voltage to forward bias at least one of said junctions, and means coupling said control voltage to said control electrode.

2. A system in accordance with claim 1, including means for limiting the conduction of time of said device to less than 180 electrical degrees.

3. A control system comprising a load to be controlled including a motor having an armature, a source of AC supply voltage, at least one semiconductor device having an odd number of PN junctions and input, output and control electrodes, the input and output electrodes of said device being connected in series with said source and said load, the maximum value of the signal from said source being such that at least one of said junctions in said device is normally reverse-biased whereby said device is in a non-conducting state, means for providing an adjustable characteristic reference signal, a phase shift circuit, means for coupling said phase shift circuit to said source to derive a phase-shifted signal, means for summing said phase-shifted signal with said reference signal to derive a control signal to forward bias at least one of said junctions, means coupling said control signal to said control electrode, and means responsive to the source of AC supply voltage for limiting the maximum conduction time of said semi-conductor device to eliminate an unstable condition which would occur when full reference voltage is applied with the motor armature at a standstill.

4. A control system for an electric motor having an armature and field winding comprising a source of alternating voltage, means connected between said source and said armature to supply unidirectional potential to said armature during at least one half cycle of said alternating voltage, said means comprising semi-conductor means having an odd number of PN junctions and input, output and control electrodes, said input and output control electrodes connected between the source and said armature, means for deriving a first signal voltage proportional to the speed of said motor, means for providing an adjustable reference voltage signal, a phase shift circuit responsive to said AC source for providing a phase shift signal, means for summing said reference voltage signal, said phase shift signal and said first signal voltage to provide a second signal, a capacitor, a transformer primary winding in circuit with an amplifying means, said capacitor responsive to said second signal and in circuit with said capacitor for selectively charging and discharging said capacitor to provide a control signal in said transformer primary winding, a control transformer secondary winding coupled to said control electrode and said transformer primary winding for initiating conduction of said semiconductor means, and means responsive to a source of AC supply voltage for limiting the maximum conduction time of said semiconductor means to eleminate an unstable condition which would occur when full reference voltage is applied with the motor armature at a standstill.

5. A control system for an electric motor having an armature and a field winding, comprising a source of alternating voltage, means connected between said source and said armature to supply unidirectional potential to said armature during at least one half cycle of said alternating voltage, said means comprising semiconductor means having an odd number of PN junctions and input, output and control electrodes, said input and output control electrodes connected between the source and said armature, means for providing a reference voltage, a phase shift circuit responsive to said source of alternating voltage for providing a phase shift signal, means for comparing said phase shift signal and said reference signal to provide a control signals to selectively initiate conduction of said semiconductor means, and means including unidirectional conducting means for deriving a signal indicative of an armature voltage reversal taking place when conduction through said semiconductor means ceases, and means responsive to said last-mentioned signal for modifying the control signal in order to modify the time of initiation of conduction of said semiconductor means.

6. A system in accordance with claim 5, including means for deriving a signal voltage proportional to the speed of said motor and including means for comparing said last-mentioned signal with said reference voltage signal and said phase shift signal.

7. A system in accordance with claim 5, including means for deriving a signal proportional to the armature current and including means for utilizing said last-mentioned signal to modify said control signal.

8. A system in accordance with claim 5, including means for deriving a delayed signal from said AC source and also including means for utilizing said last-mentioned signal to prevent said control signal from initiating conduction of said semiconductor means during a predetermined time interval.

9. A control system for an electric motor having an armature and field winding comprising a source of alternating voltage, at least one controllable rectifier having input, output and control electrodes, said input and output electrodes being connected between the source and said armature, a trigger circuit, means for deriving a phase shift signal from said AC source, means for providing a reference signal, means for providing an armature voltage signal indicative of the motor speed, means for deriving a low speed IR boost signal by only detecting a voltage reversal across the armature across the armature, means for comparing said phase shift reference speed and low IR speed boost signals to provide a first signal to selectively actuate said trigger circuit, means responsive to said trigger circuit for selectively initiating conduction of said controllable rectifier by providing a control signal to the control electrode of said controllable rectifier, and means responsive to said AC signal source for providing a signal to limit the time interval that said last-mentioned means may initiate conduction of said controllable rectifiers.

10. A control system for an electric motor having an armature and field winding comprising a source of alternating voltage, at least one controllable rectifier having input, output and control electrodes, said input and output electrodes being connected between the source and said armature, a trigger circuit, means for deriving a phase shift signal from said AC source, means for providing a reference signal, means for providing an armature voltage signal indicative of the motor speed, means for summing said phase shift reference, speed signals to provide a first signal to selectively actuate said trigger circuit, means responsive to said trigger circuit for selectively initiating conduction of said controllable rectifier by providing a control signal to the control electrode of said controllable rectifier, and means responsive to said AC signal source for limiting the maximum conduction time of said controllable rectifier to eliminate an unstable condition which would occur when full reference voltage is applied with the motor armature at a standstill.

11. In combination, a first transistor having input and out terminals, a second transistor having input and output terminals, a third transistor having input and output terminals, means for coupling the output terminal of said first transistor to the input terminal of said second transistor, means for coupling the output terminal of said second transistor to the input terminal of said first transistor, means for coupling the output terminal of said second transistor to the input terminal of said third transistor, a primary transformer winding and a capacitor coupled in series with said output terminal of said third transistor, means for maintaining said first and third transistors normally non-conducting and maintaining said second transistor normally conducting, means for charging said capacitor to a predetermined voltage during the time said third transistor is non-conducting, means for initiating conduction of said first transistor to prevent said second transistor from continuing to conduct and to initiate conduction of said third transistor, thereby discharging said capacitor through said transformer primary winding and said third transistor to provide an output signal, said combination including a source of AC voltage, a motor having an armature, and a controllable rectifier having input, output and control electrodes and further having an odd number of PN junctions, said input and output electrodes connected between said AC source and said motor armature and a transformer secondary coupled to said control element and responsive to an output signal in said transformer primary as a result of the discharge of said capacitor.

References Cited

UNITED STATES PATENTS

| 2,977,523 | 3/1961 | Cockrell | 318—331 |
| 3,177,417 | 4/1965 | Wright | 318—331 |
| 3,191,113 | 6/1965 | Gargani | 318—345 X |
| 3,239,742 | 3/1966 | Mierenderf et al. | 318—345 X |

ORIS L. RADER, *Primary Examiner.*

J. J. BAKER, *Assistant Examiner.*